3,743,708
SUBMICRON METAL OXIDE PARTICLES AND THEIR PROCESS FOR MANUFACTURE

John Donald Chase, Stamford, and Robert Louis Potter, Wilton, Conn., assignors to American Cyanamid Company, Stamford, Conn.
No Drawing. Filed Nov. 20, 1970, Ser. No. 91,573
Int. Cl. C01b 29/00; C01g 9/02
U.S. Cl. 423—617
5 Claims

ABSTRACT OF THE DISCLOSURE

Submicron metal oxide particles of zinc oxide and antimony oxide having average diameters of from 100 A. to 1300 A. are produced by vaporizing particles of the metal or metal oxide within a plasma and admixing an oxidizing gas with the plasma or its tail flame whereby controlled quenching is realized. The submicron particles produced thereby have utility as plastic or coating additives.

---

The present invention relates to the production of finely divided inorganic materials, of submicron size and more especially to submicron zinc oxide and antimony oxide.

It has been known for some time that various inorganic materials in very finely divided form have properties different from those of the same materials in their more readily available particle sizes but hitherto methods of producing such inorganic materials in very fine particle sizes have been either non-existent or rather expensive and the high price of the resulting products has restricted their use. U.S. Pat. 3,346,409 reports that zinc oxide is an inorganic pigment which is a more efficient absorber of ultraviolet light than any other white pigment. R. D. Deanin, et al. in Modern Plastics, January 1969, pp. 114–116, details the use of zinc oxide of pigmentary size ($0.11\mu$ to $0.93\mu$) as an ultra-violet absorber for the stabilization of polypropylene. Unfortunately, such stabilized polypropylene had clarity ranging from opaque to hazy thus limiting its utility. Particulate antimony oxide is known to be useful as a flame retardant additive for textiles and plastics. Such antimony oxide, however, delusters the fibers reducing their attractiveness in commerce.

The Freeman U.S. Pat. 3,449,072 details the production of various types of refractory metal oxides by the oxidation of a salt of the metal corresponding to the desired oxide. In accordance with his invention, the temperature in the zone in which the reaction between oxygen and the metal salt is initiated, is maintained sufficiently high to prevent precipitation of the oxide product therein and yet low enough to permit rapid cooling of the oxide vapor in a quenching zone contiguous with said reaction zone. In other words, the temperature in the initial reaction zone is high enough to prevent a state of supersaturation with respect to the oxide product and formation of any other solid and liquid particles which can serve as centers of nucleation. It is said to be suitable for the preparation of refractory oxides of chromium, beryllium, zirconium, cobalt, nickel, cadmium, molybdenum, vanadium, antimony and especially aluminum, silicon, titanium and born, from halide and oxyhalide salts thereof, excluding fluoride and oxyfluoride compounds but including the chlorides, bromides, iodides, mixed halides, oxychlorides, oxybromides, oxyiodides and mixture thereof.

The products obtained by the process of his invention are characterized by extremely small particle size, i.e., below 0.1 micron and more usually below 0.05 and as low as .02–.03 micron or even smaller. Unfortunately with his antimony salts, it is impossible to achieve particle sizes of less than 1 micron, i.e., pigmentary size. A comparable problem exists for zinc because oxidation reactions involving such salts have a positive free energy change which means that their conversion to the oxide is impossible at temperatures used by Freeman in his examples.

It is an object of this invention to produce sub-pigmentary particles of zinc oxide and antimony oxide.

It is a further object of this invention to achieve such production in an economically suitable manner.

These objects have been met in accordance with this invention by producing submicron metal oxide particles of from about 100 A.–1300 A. average diameter of the class consisting of zinc oxide and antimony oxide.

In preferred forms, this invention provides submicron zinc oxide particles of from 100 A. to 600 A. average diameter and antimony oxide particles of from 100 A. to 300 A. average diameter.

These submicron zinc and antimony oxide particles have been produced by the steps of: introducing a feed of zinc, zinc oxide, antimony and/or antimony oxide into a plasma or tail flame thereof; vaporizing said feed in said plasma including the tail flame portion thereof; admixing a secondary gas into said tail flame in an amount to provide less than 0.01 gram of said vaporized feed per liter of admixed gas and plasma as a controlled quench to cool rapidly the metal oxide; and adjusting the oxidizing component of said secondary gas as required to assure complete oxidation of said metal oxide.

For the purposes of this disclosure the tail flame portion of the plasma is the downstream luminous region external to and continguous with the plasma.

Carrying out the oxidation process of the present invention does not entail the use of special equipment. Any available high temperature reactor can be employed. Suitable for this purpose are conventional plasma jet or arc reactors of the type described in U.S. Letters Pats. 2,616,842, 2,806,124, and 2,858,411. These reactors, as is well-known, are capable of producing a high density plasma of extremely high temperature. This plasma stream is conveniently used to raise the reactants to required temperatures. The plasma stream may be formed with any gas inert to oxidation such as argon, nitrogen, air or oxygen.

In addition, radio frequency plasma generators may be used and these, in that they do not require the use of electrodes, can be advantageously employed when products of extremely high purity are required. It is even possible to use a combustion flame as the heat source when a temperature of at least 2000° C. is available as with an oxygen-acetylene flame.

Advantageously, the feed may be of particles less than about 100 microns average diameter e.g., 1–100 microns. The particles can be introduced into the plasma by various means depending on the form of the generator in use. The essential requirement is that the feed is vaporized in the plasma and then rapidly and as uniformly as possible, quenched downstream within the luminous region. When an RF generator is employed, the feed is conveniently injected down the whole length of a plasma generator and can be entrained in a plasma-forming or carrier gas.

When a direct current or low frequency alternating current plasma generator, having electrodes, is employed, the feed may as well be introduced through an electrode.

Another means for carrying out the process of the invention involves the use of a high intensity arc where the feed is mixed with sufficient carbon (about 25%) and binder and fabricated into an electrode. In this case the tip of the electrode is vaporized by the arc. The fine particles are formed by admixing the vaporized feed material with air or oxygen and thus forming the finely divided oxide particles.

The feed is zinc, antimony, antimony oxide, zinc oxide or mixtures thereof. The secondary gas admixed into the tail flame portion primarily functions as a controlled quench and diluent and for systems requiring oxygen to complete the reaction as a source of oxygen. Typically the secondary gas is air, oxygen or nitrogen.

The exact temperature of the vaporization zone will depend upon many factors, and, because of extreme heat-loss under high temperature conditions, the temperature will vary along the path of vaporization to condensation. Whatever may be the characteristics of the plasma generator employed, the temperature of the vaporization zone must be such that the temperature is above the precipitation temperature for the feed. In order to illustrate the method of arriving at the temperature to be employed, it may be useful to take the case where the reactor is a plasma jet torch. The hot-flowing plasma can be adjusted to any temperature as low as 2,000° C., or as high as 20,000° C.

The temperature of the plasma must be sufficient so that its heat content will raise the temperature of the feed above its precipitation temperature and keep it above this critical temperature throughout the plasma.

The concentration of the volatilized metal or vaporized metal oxide after the secondary gas has been admixed must be quite dilute, e.g., concentrations of from 0.003 to 0.0002 gram of product per liter (STP) of total gas have been found advantageous. Particles of up to about 600 A. are obtained under these advantageous concentrations.

The maximum useful concentration of the product in the quench region is about 0.01 gram/liter of total admixed gases. At higher concentrations, the oxide particles produced have too large a size, e.g., 2000 A. average diameter and higher.

In following the process of this invention admixture is preferably by introduction of the secondary gas into the tail flame under pressure at right angles to the flow path. Turbulence causes rapid mixing of the secondary gas with the tail flame resulting in useful quenching and dilution. One might inject such a cold gas into the stream at the terminal region of the tail flame through a number of peripherally arranged, radially directed orifices.

Precipitated oxide can be collected by filtration through a filter or by conventional agglomeration methods.

The following examples are presented to further illustrate the present invention. In Examples 1–3, use is made of an RF generator. All volumes of this specification are measured under standard temperature and pressure (STP).

EXAMPLE 1

A flow of .078 g./min. of commercial (N. J. Zinc Co.) zinc dust is suspended in a stream 0.8 l./min. of argon carrier gas and introduced into the radio frequency plasma through a downstream facing probe positioned in the plasma. The plasma forming gas is argon and its flow rate is 1.14 s.c.f.m. The power coupled to plasma is 1.35 kw. resulting in a power density of 595 B.t.u./lb. argon. Into the plasma tail flame 10 s.c.f.m. of oxygen is admixed. The mixed gases and zinc oxide product flow through a silica tube and heat exchanger where the gases are cooled prior to passing through a filter bag at the exit of the heat exchanger. White zinc oxide product was collected at substantially stoichiometric yield. The zinc oxide had a surface area (BET) of 40 m.$^2$/gm. which is equivalent to a surface area average particles diameter of 268 A.

EXAMPLE 2

A flow of 0.58 g./min. of −325 mesh antimony powder is suspended in a stream of 0.8 l./min. of argon carrier gas and introduced into the radio frequency plasma through a downstream facing probe positioned in the plasma. The plasma-forming gas is argon and its flow is 1.2 s.c.f.m. The power coupled to the plasma discharge is 1.35 kw. resulting in a power density of 565 B.t.u./lb. argon. Into the plasma tail flame 10 s.c.f.m. of oxygen quench gas is admixed. White antimony oxide product, collected as in Example 1, was obtained in 91% yield. The antimony oxide product had a surface area average particle diameter of 340 A.

EXAMPLE 3

A flow of 0.43 g./min. of 0.15–0.2$\mu$ antimony oxide powder (Harshaw Chemical Co.) is suspended in a stream of 1.2 l./min. of oxygen carrier gas and introduced into the plasma. The plasma forming gas is argon and its flow is 1.2 s.c.f.m. The power coupled to the plasma is 1.35 kw., resulting in a power density of 560 B.t.u./lb. argon. Into the plasma tail flame 10.3 s.c.f.m. of air was admixed. White antimony oxide was collected as above and at substantially 100% yield. The antimony oxide collected had an average particle diameter of 142 A.

EXAMPLE 4

In this example a dc plasma torch is used and the feed is directed into the tail flame. This torch is model H50A (Thermal Dynamics Inc.). A flow of 0.1 gm./min. of commercial zinc dust is suspended in a stream of 1.1 l./min. of argon carrier gas and introduced through a ⅛ in. hole in a water-cooled feed disc positioned adjacent and immediately downstream of the plasma torch. The plasma-forming gas is 1.5 gram-moles/min. of argon. The plasma torch operates at 500 amps and 23 volts. A 2 in. i.d., 6 in. long alumina mixing tube, insulated within a 6 in. i.d. water-cooled housing, is located downstream of the feed disc. Through a quench disk positioned just downstream of the mixing section, 10 s.c.f.m. of oxygen is admixed with the tail flame through a 1/32 in. radial slot. The mixed gases and zinc oxide product flow through a heat exchanger where the gases are cooled prior to passing through a filter bag, where the zinc oxide is collected at substantially stoichiometric yield. The white zinc oxide collected had a surface area of 35 m.$^2$/gm., which is equivalent to an average particle diameter of 305 A.

EXAMPLE 5

A high intensity arc is maintained between a 1 in. diameter anode, comprised of a mixture of antimony oxide and graphite and a ½ in. diameter thoriated tungsten cathode. The cathode is constructed by compressing a mixture of 75 parts of −140 mesh antimony oxide with 22 parts of graphite and a suitable binder. The arc current is 450 amps and the electrode vaporization rate is 1.3 lb./hr. The electrodes are situated in a closed chamber whereby an air quench line was incorporated along with the electrodes. Air quench gas at a rate of 3 s.c.f.m is injected into the tail flame at an angle of 45° from the anode axis and 1½ in. from the anode. The gas flow from the arc chamber passes through a connecting heat exchanger at the outlet of which is a filter bag for collection of the $Sb_2O_3$. The exit gas passes through the filter bag to an exhaust duct. The $Sb_2O_3$ product is collected in substantially 100% yield and has a surface area average particle diameter of 170 A. In addition to $Sb_2O_3$, the solids product collected contained 0.12 weight percent carbon.

For the use of zinc oxide as an ultraviolet absorber in clear films, the light scattered or reflected back from the film by the oxide particles must be very small so that a large fraction of the incident light passes through to the substrate. In other words, the film containing zinc oxide must be essentially transparent. A common index or measurement of transparency is the contrast ratio, defined as the ratio of light reflected by a black background to light reflected by a white background, both of which are coated by the film of interest. For optical clarity, the contrast ratio should approach zero, and a contrast ratio greater than about 0.02 generally leads to a cloudy or milky appearance in the film.

A sample of zinc oxide made by the process of Example 1 was dispersed and tested in a polyurethane film to determine its contrast ratio. The results are shown in Table I.

TABLE I

| | Contrast ratio |
|---|---|
| 1% zinc oxide (by volume) | 0.014 |
| 1% commercial U.V. absorber [1] | 0.017 |
| 2% zinc oxide | 0.018 |
| 2% commercial U.V. absorber [1] | 0.016 |

[1] 2,2'-dihydroxy-4-methoxybenzophenone.

Since VU absorbers are commonly used at the 2% level in clear films, this test demonstrated the excellent clarity of the solid zinc oxide product of this invention, when compared with a commercial organic absorber.

To test the ability of the ultrafine zinc oxide to stabilize a clear film to U.V. light, the commonly used yellow index technique was employed. Prolonged exposure to U.V. causes clear films to eventually yellow and degrade. Accelerated testing of this material in a Fade-O-Meter is a rapid means of comparing the zinc oxide product with a commercial absorber. The results of one such test are shown below in Table II. Again a polyurethane film was used.

TABLE II

| Yellow Index | Initial | 20 hours | 40 hours |
|---|---|---|---|
| Polyurethane (no additive) | 12.6 | 16.9 | 23.3 |
| Polyurethane (2% U.V. absorber) [1] | 10.5 | 15.0 | 18.5 |
| Polyurethane (2% zinc oxide 350 A. diameter) | 11.2 | 15.1 | 17.6 |

[1] Mixed lower alkyl esters of p-methoxy benzylidene malonic acid.

Table II shows the polyurethane containing no ultraviolet stabilizer to rapidly yellow, which is accompanied by degradation of the film strength. This degradation is clearly retarded by both additives, with the zinc oxide providing better protection than a U.V. absorber widely used for this purpose.

Antimony oxide made by the process of Example 3 was tested as a non-delustering fire retardant additive in acrylic fiber. The fiber contained 3% by weight of the additive. Luster index measurements were made on the fiber and are shown below. An acceptable luster index (indicative of the brightness of the fiber) is 50%.

TABLE III

| Run | Grams $Sb_2O_3$ total gas | Average diameter (A.) | Luster index |
|---|---|---|---|
| Commercial $Sb_2O_3$ | | 5,000 | 6 |
| 37 | $1.1 \times 10^{-4}$ | 820 | 12 |
| 47 | $0.6 \times 10^{-4}$ | 540 | 17 |
| 48 | $0.2 \times 10^{-4}$ | 290 | 43 |
| 50 | $0.1 \times 10^{-4}$ | 208 | 50 |
| 46 | $0.2 \times 10^{-4}$ | 150 | 61 |

As the particle size of $Sb_2O_3$ was decreased, acceptable luster indices were obtained.

Although the foregoing discussion has been limited to submicron oxides of antimony and zinc, it is expected that submicron particles of tin oxide, molybdenum oxide, and tungsten oxide can be obtained by the process of this invention.

We claim:
1. White submicron antimony oxide particles having from 100 A. to 300 A. average diameter.
2. A process for the manufacture of submicron metal oxides of the class consisting of zinc oxide and antimony oxide which comprises:
  (a) introducing a feed of the class consisting of zinc, zinc oxide, antimony and antimony oxide into a plasma gas stream of sufficient temperature and heat content to vaporize said feed;
  (b) vaporizing said feed in said gas stream;
  (c) admixing an oxidizing gas into said gas stream in an amount to provide less than 0.010 gram of metal oxide per liter of admixed gases as a controlled quench to cool rapidly the metal oxide; and
  (d) adjusting the oxidizing component of said oxidizing gas as required to assure complete oxidation of said metal.
3. The process of claim 2 wherein the said feed is a metal, and said oxidizing gas contains more than a stoichiometric amount of oxygen necessary to react with said feed.
4. The process of claim 2 wherein said feed is zinc particles of from 1 to 100 microns diameter, said gas stream has a temperature of from 4000° C. to 20,000° C., said oxidizing gas providing from 0.003 to 0.0002 gram of said metal oxide per liter of admixed gases.
5. The process of claim 2 wherein said feed is antimony particles, said gas stream is argon of a temperature of at least 4000° C., said oxidizing gas is air providing from 0.003 to 0.0002 gram of said metal oxide per liter of admixed argon and air.

References Cited

UNITED STATES PATENTS

| 2,898,191 | 8/1959 | Conn et al. | 23—147 |
| 3,328,126 | 6/1967 | Stefano et al. | 23—144 |
| 3,403,001 | 9/1968 | Mas et al. | 23—144 |
| 3,486,913 | 12/1969 | Zirngibl et al. | 23—144 |
| 3,574,546 | 4/1971 | Skrivan | 23—144 |

OSCAR R. VERTIZ, Primary Examiner

H. S. MILLER, Assistant Examiner

U.S. Cl. X.R.

423—623

UNITED STATES PATENT OFFICE
CERTIFICATE OF CORRECTION

Patent No. 3,743,708     Dated 3rd July, 1973

Inventor(s) CHASE, John Donald, and POTTER, Robert Louis

It is certified that error appears in the above-identified patent and that said Letters Patent are hereby corrected as shown below:

Page 1, Column 2, line 41, after "plasma" add -- stream -- before of.

Page 3, Column 5, line 14, after "Since" add -- UV -- instead of VU

Signed and sealed this 2nd day of July 1974.

(SEAL)
Attest:

EDWARD M. FLETCHER, JR.
Attesting Officer

C. MARSHALL DANN
Commissioner of Patents